United States Patent
Kohlbrenner et al.

(10) Patent No.: US 12,493,875 B2
(45) Date of Patent: Dec. 9, 2025

(54) COMPUTER IMPLEMENTED METHOD FOR PROVIDING A VEHICLE SERVICE AND TRIGGERING A PROCESS TO PAY FOR THE VEHICLE SERVICE, SOFTWARE PROGRAM, AND SYSTEM

(71) Applicant: Bayerische Motoren Werke Aktiengesellschaft, Munich (DE)

(72) Inventors: Felix Kohlbrenner, Munich (DE); Christian Loebel, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 406 days.

(21) Appl. No.: 17/772,375

(22) PCT Filed: Apr. 29, 2020

(86) PCT No.: PCT/EP2020/061951
§ 371 (c)(1),
(2) Date: Apr. 27, 2022

(87) PCT Pub. No.: WO2021/104682
PCT Pub. Date: Jun. 3, 2021

(65) Prior Publication Data
US 2022/0405743 A1 Dec. 22, 2022

(30) Foreign Application Priority Data
Nov. 27, 2019 (EP) .................... 19211786

(51) Int. Cl.
*G06Q 20/38* (2012.01)
*B60L 53/18* (2019.01)
(Continued)

(52) U.S. Cl.
CPC .......... *G06Q 20/389* (2013.01); *B60L 53/665* (2019.02); *G06Q 20/065* (2013.01);
(Continued)

(58) Field of Classification Search
CPC .... G06Q 20/389; G06Q 20/065; G06Q 20/24; G06Q 20/3827; G06Q 30/0601;
(Continued)

(56) References Cited

U.S. PATENT DOCUMENTS

2010/0042340 A1* 2/2010 Piszko .................... G01F 9/008
702/55
2016/0221455 A1 8/2016 Ando et al.
(Continued)

FOREIGN PATENT DOCUMENTS

CN 110020842 A 7/2019
CN 110033260 A 7/2019
(Continued)

OTHER PUBLICATIONS

Rebecca S. Levinson, Impact of public electric vehicle charging infrastructure, 2018, p. 158-159 (Year: 2018).*
(Continued)

*Primary Examiner* — Ibrahim N El-Bathy
(74) *Attorney, Agent, or Firm* — Crowell & Moring LLP

(57) ABSTRACT

A vehicle service and a process to pay for the vehicle service are provided. A data connection is established between a service point and an electronic control unit of a vehicle. Initial vehicle service data is gathered that includes a timestamp of establishing the data connection, identification data of the vehicle, and, at the time of the timestamp, at least one value of a state of the vehicle indicating a quantity which is to be altered by the provision of the vehicle service. Service provider service data of the completed vehicle service is stored on the blockchain network. The validity of the provision of the vehicle service is checked by comparing the initial and final vehicle service data and the provider service data of the completed vehicle service. When the validity is
(Continued)

confirmed, the process to pay for the vehicle service is triggered on the blockchain network.

16 Claims, 3 Drawing Sheets

(51) Int. Cl.
| | | |
|---|---|---|
| *B60L 53/66* | (2019.01) | |
| *G06Q 20/06* | (2012.01) | |
| *G06Q 20/24* | (2012.01) | |
| *G06Q 30/0601* | (2023.01) | |
| *G06Q 30/0645* | (2023.01) | |
| *G07F 17/00* | (2006.01) | |

(52) U.S. Cl.
CPC ......... *G06Q 20/24* (2013.01); *G06Q 20/3827* (2013.01); *G06Q 30/0601* (2013.01); *G06Q 30/0645* (2013.01); *G07F 17/0057* (2013.01); *B60L 53/18* (2019.02); *G06Q 2220/00* (2013.01); *G06Q 2240/00* (2013.01)

(58) Field of Classification Search
CPC ........... G06Q 30/0645; G06Q 2220/00; G06Q 2240/00; B60L 53/665; B60L 53/18; G07F 17/0057
See application file for complete search history.

(56) References Cited

U.S. PATENT DOCUMENTS

| | | | |
|---|---|---|---|
| 2017/0316621 A1* | 11/2017 | Jefferies | B60R 25/01 |
| 2017/0358168 A1 | 12/2017 | Fan et al. | |
| 2019/0210479 A1* | 7/2019 | Bachmann | B60L 15/38 |
| 2019/0275898 A1 | 9/2019 | Haneda | |
| 2020/0202334 A1 | 6/2020 | Graf et al. | |
| 2020/0226559 A1* | 7/2020 | Boss | G06F 16/23 |
| 2021/0065293 A1* | 3/2021 | Sigler | G06Q 20/24 |
| 2021/0268929 A1* | 9/2021 | Cater | B60L 53/67 |
| 2023/0342741 A1* | 10/2023 | Wang | G06Q 20/36 |

FOREIGN PATENT DOCUMENTS

| | | |
|---|---|---|
| DE | 10 2017 214 902 A1 | 2/2019 |
| JP | 2012-34562 A | 2/2012 |
| JP | 2015-56935 A | 3/2015 |
| JP | 2018-55203 A | 4/2018 |
| JP | 2018-85906 A | 5/2018 |
| JP | 2019-113957 A | 7/2019 |
| WO | WO 2019/038137 A1 | 2/2019 |
| WO | WO 2019/215437 A1 | 11/2019 |

OTHER PUBLICATIONS

International Search Report (PCT/ISA/210) issued in PCT Application No. PCT/EP2020/061951 dated May 20, 2020 (two (2) pages).
Written Opinion (PCT/ISA/237) issued in PCT Application No. PCT/EP2020/061951 dated May 20, 2020 (five (5) pages).
Extended European Search Report issued in European Application No. 19211786.9 dated Apr. 15, 2020 (seven (7) pages).
Japanese-language Office Action issued in Japanese Application No. 2022-514211 dated Nov. 8, 2023 with English translation (2 pages).
Chinese-language Office Action issued in Chinese Application No. 202080070798.0 dated Jun. 30, 2025, with English translation (16 pages).

* cited by examiner

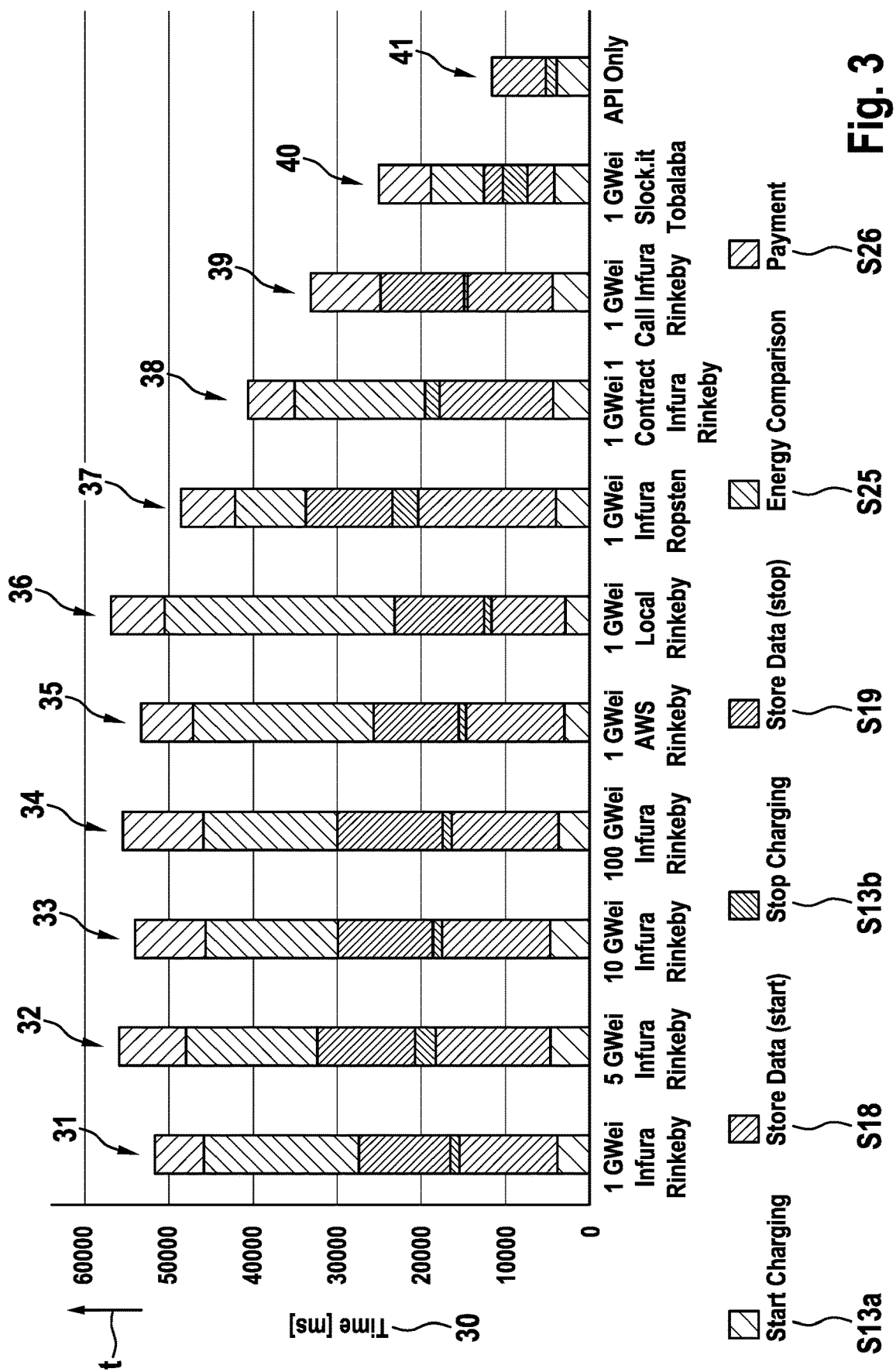

COMPUTER IMPLEMENTED METHOD FOR PROVIDING A VEHICLE SERVICE AND TRIGGERING A PROCESS TO PAY FOR THE VEHICLE SERVICE, SOFTWARE PROGRAM, AND SYSTEM

BACKGROUND AND SUMMARY OF THE INVENTION

The present subject matter relates to a computer implemented method for providing a vehicle service and triggering a process to pay for the vehicle service, a software program realizing the method, and a system for providing the vehicle service and triggering the process to pay for the vehicle service.

Drivers of conventional vehicles, such as cars and/or trucks, have to conduct many manual tasks such as charging, fueling, or parking. Most of these tasks require payment actions which are implemented in different manners, i.e., by using a subscription model, cash or credit card payment, or contract-based payment. With the adaptation of fully autonomous cars at level 4 or 5, there will be an issue to process these payments automatically, since there will not be a driver to conclude the tasks. Self-driving cars rely on several services to operate, some of which require financial interactions, such as paying for parking spaces or paying for battery charging in case of the electric vehicles. Providing these services demands the cooperation of several parties and organizations who do not necessarily trust each other. Over the past few years, several blockchain-based services have been introduced to enable users with a safe and secure medium for conducting business in a trustless environment.

It is therefore an object of the present subject matter to provide a computer implemented method for providing a vehicle service and triggering a process to pay for the vehicle service such that the vehicle service is provided and payed for in a safe and secure manner without having to trust a single organization. It is also an object to provide the method such that a payment service provider can be avoided for reducing operational costs and the same method can be used for different kinds the vehicle services. It is a further object to provide the method in an automated manner to enable an autonomous vehicle to consume and pay for the vehicle service, i.e. without any assistance of a user.

The computer implemented method according to the present subject matter for providing a vehicle service and triggering a process to pay for the vehicle service comprises the steps:

establishing a data connection between a service point unit for providing the vehicle service and an electronic control unit of a vehicle, and gathering initial vehicle service data at a start of a provision of the vehicle service in the electronic control unit, wherein the initial vehicle service data comprise a timestamp of establishing the data connection, identification data of the vehicle, and at the time of the timestamp at least one value of a state of the vehicle indicating a quantity which is to be altered by the provision of the vehicle service, storing the initial vehicle service data and final vehicle service data gathered in the electronic control unit, which are updated initial vehicle service data at an end of the completion of the provision of the vehicle service, consecutively or along with each other on a blockchain network configured to be resistant to modification of data, and storing on the blockchain network service provider service data of the completed vehicle service gathered in a service provider communication unit, which is connected to the service point unit, checking on the blockchain network a validity of the provision of the vehicle service by comparing at least a first numerical value of the initial and final vehicle service data of a predetermined unit with at least a second numerical value of the provider service data of the completed vehicle service of the predetermined unit, such that the validity is positive, when the first and second numerical values and/or a third numerical value, which results from the comparison based on an arithmetical operation using the first and second numerical values, are/is within a predetermined range of numerical values or below/above a predetermined threshold value, and, when the validity is positive, triggering on the blockchain network the process to pay for the vehicle service.

A vehicle service may be any service related to a vehicle such as a car, truck, bike, motorcycle, boat, ship, airplane or other movable vessel which can be received by the vehicle or provided by the vehicle in an exchange for a payment. Examples for the vehicle service include electric charging the vehicle being an electric vehicle or a hybrid vehicle, fueling the vehicle comprising a combustion engine or a hydrogen engine, fueling the vehicle being the hybrid vehicle, parking, paying tolls, using the vehicle for rent, and shopping from within the vehicle. The vehicle service can therefore be defined as a vehicle related financial transaction, which is an agreement, communication, or movement carried out between a buyer in form of the vehicle or user of the vehicle and a seller in form of a vehicle service provider to exchange an asset such as electric or fossil energy for payment.

The data connection between the service point unit for providing the vehicle service and the electronic control unit of the vehicle can be wired or wireless and the data conveyed by the service point to the electronic control unit can be in any form such as analog, digital, audio, or video data or simply in the form of providing or changing a current or a voltage at a data port of the vehicle connected to the electronic control unit or of the electronic control unit itself. For example, reading an event of plugging in a charging cable into a charging port of the vehicle from a vehicle bus of the vehicle may qualify as establishing the data connection. The provision of the vehicle service may take some time, e.g., when electrically charging a battery of the vehicle, such that the initial and final vehicle data are generated to comprise information at a start and at and end of the provision of the vehicle service, respectively. If the vehicle service is provided instantly, e.g., when shopping form within the vehicle or receiving a parking ticket, the initial vehicle service data comprise information at a point in time from immediately or shortly, e.g., a millisecond to a second, before the provision of the vehicle service and the final vehicle service data comprise information at a point in time from immediately or shortly, e.g., a millisecond to a second, after the provision of the vehicle service. The initial and/or the final vehicle service data may comprise besides the timestamp of establishing the data connection, the identification data of the vehicle, and at the time of the timestamp the least one value of the state of the vehicle indicating a quantity which is to be and/or has been altered by the provision of the vehicle service further information such as positioning data, e.g., GPS (Global Positioning System) data of the vehicle, before and/or after provision of the vehicle service.

The electronic control unit may be the Engine Control Unit of the vehicle, in the form of a single unit or comprised by another unit of the vehicle, and located inside of the vehicle in form of a fixed or removable unit. The initial and final vehicle service data may be gathered in the electronic control unit in a RAM (Random Access Memory), on a HD (Hard Disk) or an SSD (Solid State Disk) or the like. Storage on a removable storage medium, such as a USB-stick (Universal Serial Bus), connected to the electronic control unit by a suitable interface is also possible. A Raspberry Pi may be used as the electronic control unit.

The blockchain network, also called blockchain or block chain, resistant to modification of data can be defined as a growing list of records, called blocks, that are linked using cryptography, wherein each block contains a cryptographic hash of the previous block, a timestamp, and transaction data which are generally represented as a Merkle tree. Blockchain is an open, distributed ledger that can record transactions between two parties efficiently and in a verifiable and permanent way. For use as a distributed ledger, the blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. Therefore, although blockchain records are not unalterable, the blockchain may be considered secure by design and exemplify a distributed computing system with high Byzantine fault tolerance. The blockchain may be in the form of an Ethereum blockchain, wherein the Ethereum can be defined as an open source, public, blockchain-based distributed computing platform and operating system featuring smart contract (scripting) functionality. The electronic control unit may consecutively, i.e., at first the initial and afterwards the final vehicle service data, or along with each other, i.e. the initial and final vehicle service data as combined data, store the initial and final data on the blockchain network. For a high level of transparency, a user of the vehicle may be allowed to take notice of/track/access the initial and final vehicle service data and/or the service provider service data of the completed vehicle service.

The validity of the provision of the vehicle service is checked on the blockchain network by comparing at least a first numerical value of the initial and final vehicle service data with at least a second numerical value of the provider service data of the completed vehicle service, wherein both values are of the same predetermined unit. For example, the first numerical value may be a charging duration in the unit of seconds or a charging consumption in the unit of kWmin or kWh. The second numerical value of the provider service data of the same unit of seconds or kWmin/kWh may be larger than the first numerical value for e.g., an energy loss in the transmission of the electric charge from the service point unit in form of a charging station to the vehicle. Both values are compared on the blockchain network by comparing their margins to borders of the predetermined range of numerical values or to a predetermined threshold. Alternatively, and/or additionally, the third numerical value resulting from the comparison based on an arithmetical operation using the first and second numerical values, such as a subtraction thereof from each other or a quotient thereof as a ratio of the first and second numerical values, may be used to be compare both values with each other. When the first and second numerical values and/or the third numerical value are/is within the predetermined range of numerical values or below/above the predetermined threshold value, the provision of the vehicle service is positive.

In case of a positive validity, the process to pay for the vehicle service is triggering on the blockchain network. The comparing and triggering may be executed by a smart contract. The payment may occur on the blockchain network or by conventional means such as using a credit card.

The method of the present subject matter thus comprises a blockchain-based checking of the validity of the provision of the vehicle service to enable vehicles to consume and pay for services. To prepare for the future of autonomous cars and also to make the life of an everyday car owner easier, the method of the present subject matter enables the vehicle to generate value and act as an individual business unit. The electronic control unit is able to connect to several ecosystems in form of several service provider communication units and the blockchain network which can handle the processing and communication with different service providers. One or more of the service provider communication units may be in the form of a service provider backend unit. The combination of the electronic control unit, the respective service provider communication unit, and the blockchain network can be used to automatically pay all fees and costs the vehicle generates as well as handle the authentication process when communicating with infrastructure such as barriers at a parking lot. It enables micro or nano payments for higher accuracy when billing the charging or parking events. Furthermore, the inventive method also allows generating income through the vehicle/car or ridesharing functionalities. Additionally, by benefiting from the blockchain network, the method according to the present subject matter provides a safe and secure provision of vehicle services where users are not required to trust a single organization. Also, the method offers high transparency through tracking the consumption of vehicle and charge point on the blockchain and avoids the need for a payment service provider and thus reduces operational costs.

After the step of establishing the data connection between the service point unit and the electronic control unit and before the step of storing the data of the electronic control unit and the service provider communication unit on the blockchain network, the following step may advantageously occur:

exchanging between the service provider communication unit and the electronic control unit a message to initiate a provision of the vehicle service, e.g., by sending the message from the electronic control unit to the service provider communication unit, and, when the provision of the vehicle service is completed, a further message indicating that the provision of the vehicle service is completed, e.g., by sending the further message from the electronic control unit to the service provider communication unit. A connection between the electronic control unit and the service provider communication unit may be wireless and/or involve data transmission over the Internet. The electronic control unit thus can inform the service provider communication unit that the vehicle is able to receive a vehicle service such as charging a battery of the vehicle. The service provider communication unit can in return inform the service point unit, which may be connected by wire or wireless to the service provider communication unit, that an electric charge can be transferred to the vehicle. Also, the service provider communication unit can inform the electronic control unit that the service point unit is able to provide/deliver a vehicle service such as charging a battery of the vehicle. The electronic control unit can in return inform the service provider communication unit that the battery of the vehicle is fully charged and that the provision/delivery of electric charge to the vehicle can came to an end.

In an advantageous embodiment of the present subject matter, the establishing of the first data connection is used as a trigger for the exchanging of the message between the service provider communication unit and the electronic control unit to initiate the provision of the vehicle service. For example, when a charging cable is plugged in the vehicle's charging port, the electronic control unit reads this event from the vehicle bus and triggers a start charging event at the service point unit in the form of a charge point. This way, the provision of the vehicle service is quickly initiated in a simple manner.

It is preferred that a hash of the initial vehicle service data and a further hash of the final vehicle service data are stored on the blockchain network, wherein the hash and the further hash are signed by the electronic control unit. This way, a transfer of the initial and final vehicle service data to the blockchain network can occur securely and trustworthy.

As stated above, the vehicle service may comprise at least one of electric charging the vehicle being an electric vehicle or a hybrid vehicle, fueling the vehicle comprising a combustion engine or a hydrogen engine, fueling the vehicle being the hybrid vehicle, parking, paying tolls, using the vehicle for rent, and shopping from within the vehicle. This way, by using the method according to the present subject matter, different kinds of vehicle services can be provided to and by the vehicle securely in a trustless environment.

As mentioned above, when the vehicle service is the electric charging, the data connection between the service point unit and the electronic control unit may be in the form of an electric vehicle charging station and be established by plugging a charging cable of the electric vehicle charging station in a charging port of the vehicle, wherein the comparing of the first numerical value with the second numerical value advantageously comprises comparing of a charging duration or a charging consumption. A combination of the charging duration and the charging consumption is also possible.

Depending on the service provider providing the service point unit and the service provider communication unit the process to pay for the vehicle service is executed either on the blockchain network, e.g., through a stable coin to prevent a price fluctuation of cryptocurrencies, or by using conventional means, particularly a credit card. The inventive method is thus flexible to trigger any kind of payment process to pay for the vehicle service. It is preferred to store data of a user of the vehicle such as personal information and/or other user specific information such as credit card data off-chain, i.e. not on the blockchain network, to increase the users' privacy. If the vehicle is assigned to a user, the user data are represented by the identification data of the vehicle gathered in the electronic control unit and comprised by the initial and final vehicle service data.

It is preferred that the storing of the initial and final vehicle service data on the blockchain network, the checking of the validity of the provision of the vehicle service, and the triggering of the process to pay for the vehicle service occur automatically. This way, false and/or detrimental interaction by a user or third party is minimized and the method is executed quickly and securely.

Advantageously, at least the checking of the validity of the provision of the vehicle service and the triggering of the process to pay for the vehicle service occur by using a smart contract, e.g., an Ethereum smart contract, wherein the smart contract is used as a single smart contract for different kinds of vehicle services, particularly those vehicle services mentioned above. This way, a single smart contract can be used simply and effectively for different kinds of vehicle services to reduce operational costs. In case, the payment process is handled by the smart contract, a payment service provider becomes redundant and can be omitted.

It is advantageous, when the method occurs fully automated such that the method can be executed by the vehicle being an autonomous or self-driving vehicle.

Another aspect of the present subject matter is a software program realizing the methods according to the present subject matter when executed on a computer. In the aforementioned software program the computer is preferably a distributed computing system wherein part of the computing system is located/arranged/operated in a cloud computing system. The software program may be embodied as a non-transitory computer program product or a non-transitory data carrier carrying data representing the software program.

The present subject matter also relates to a system for providing a vehicle service and triggering a process to pay for the vehicle service. The system comprises:

data connection means for establishing a data connection between a service point unit configured to provide the vehicle service and an electronic control unit of a vehicle, wherein the electronic control unit is configured to gather initial vehicle service data at a start of a provision of the vehicle service in the electronic control unit, wherein the initial vehicle service data comprise a timestamp of establishing the data connection, identification data of the vehicle, and at the time of the timestamp at least one value of a state of the vehicle indicating a quantity which is to be altered by the provision of the vehicle service, the electronic control unit configured to store the initial vehicle service data and final vehicle service data gathered in the electronic control unit, which are updated initial vehicle service data at an end of the completion of the provision of the vehicle service, consecutively or along with each other on a blockchain network configured to be resistant to modification of data, a service provider communication unit connected to the service point unit and configured to store on the blockchain network service provider service data of the completed vehicle service gathered in the service provider communication unit, checking means in the blockchain network for checking on the blockchain network a validity of the provision of the vehicle service by comparing at least a first numerical value of the initial and final vehicle service data of a predetermined unit with at least a second numerical value of the provider service data of the completed vehicle service of the predetermined unit, such that the validity is positive, when the first and second numerical values and/or a third numerical value, which results from the comparison based on an arithmetical operation using the first and second numerical values, are/is within a predetermined range of numerical values or below/above a predetermined threshold value, and, triggering means in the blockchain network configured such that, when the validity is positive, the process to pay for the vehicle service is triggered on the blockchain network.

The system of the present subject matter shows the same advantages and effects as those mentioned in connection with the inventive method. The checking means and the triggering means may advantageously be combined in a smart contract.

It is preferred when the service point unit and the service provider communication unit are integrated in a single unit. This way, separate housings are avoided and a chance for transmission errors between both units is minimized.

The blockchain network is advantageously embodied as an Ethereum blockchain or an Ethereum main-net. These networks are reliable and user friendly and able to deliver the required performance in terms of storage capacity and response time/latency. It is preferred that a Rinkeby network as an Ethereum test network, a Ropsten network as a further Ethereum test network, or a Tobalaba network as an Ethereum based test network of the Energy Web Chain is configured to combine the storing of the initial and final vehicle service data on the blockchain network, the checking of the validity of the provision of the vehicle service, and the triggering of the process to pay for the vehicle service. Using any of these configurations, the response time/latency is optimized for providing a quick and reliable performance of the system.

Other aspects, features and advantages of the present subject matter will become apparent by the below description of exemplary embodiments alone or in cooperation with the appended figures.

BRIEF DESCRIPTION OF THE DRAWINGS

FIG. 3 is a graphic representation of Ethereum transaction latencies using different network configurations of the system for checking the validity of the provision of the vehicle service and triggering the process to pay for the vehicle service according the present subject matter.

DETAILED DESCRIPTION OF THE DRAWINGS

Figure 1:
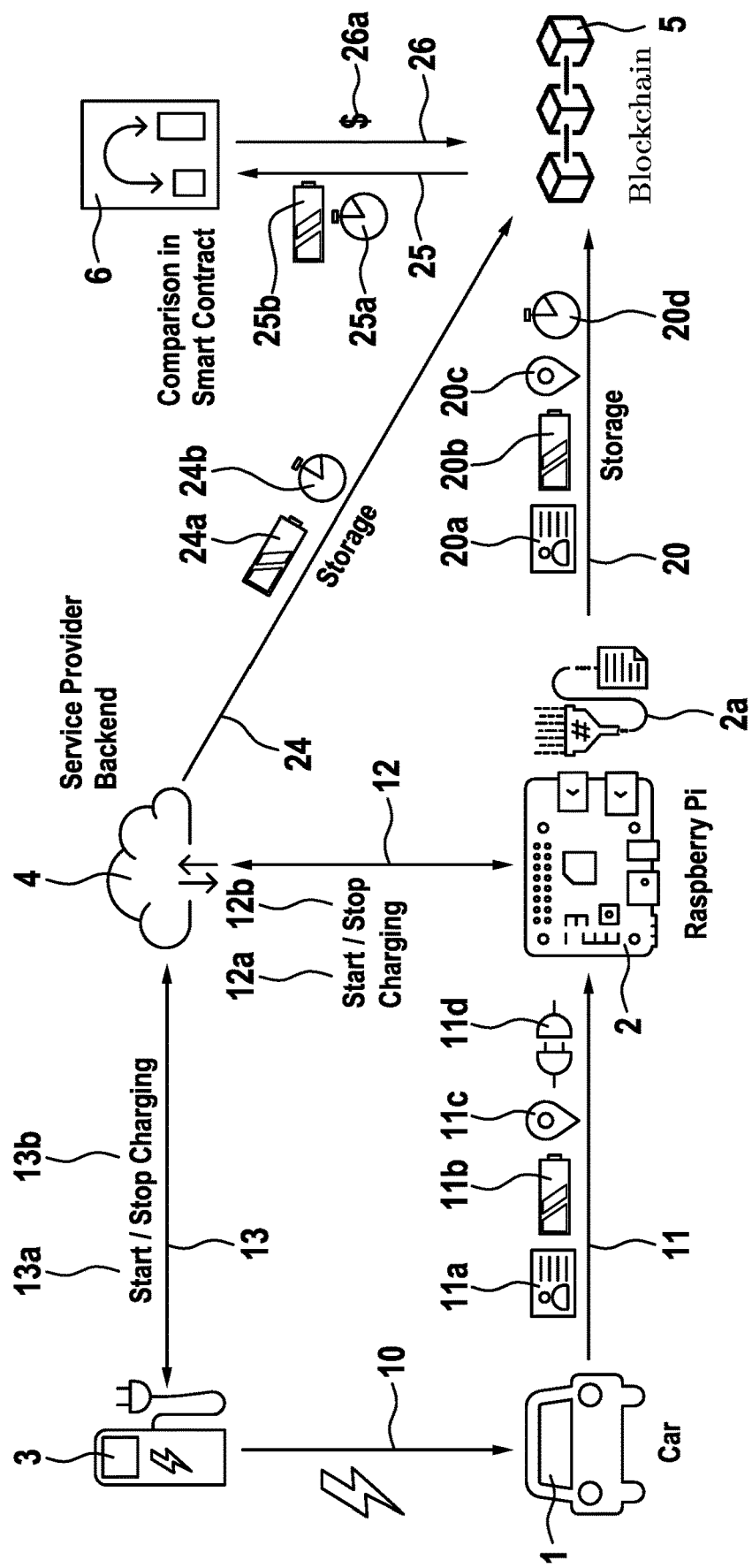
FIG. 1 is a schematic workflow diagram including functional units of a system for checking a validity of a provision of a vehicle service in form of electric charging an electric car and triggering a process to pay for the vehicle service according to the present subject matter.

FIG. 1 shows a workflow diagram including functional units 1, 2, 3, 4, 5, and 6 of a system for checking a validity of a provision of a vehicle service in form of electric charging an electric car 1 and triggering a process to pay for the electric charging. The vehicle 1 in form of the electric car is connected over a data and energy transferring connection 10 in form of a charging cable to a service point 3 embodied as a charging station or charging point. The service point 3 is connected via a first service data connection 13 to a service provider 4 providing the electric charging of the vehicle 1 for transmitting the messages of Start Charging 13a and Stop charging 13b as request and/or acknowledgement messages between the service point 3 and the service provider 4.

An electronic control unit 2 of the vehicle 1 is represented by a Raspberry Pi comprising an analyzing unit 2a for analyzing vehicle data and vehicle service data when the charging cable 10 is plugged in or unplugged from a charging port of the vehicle 1. The vehicle 1 communicates via a vehicle data connection 11 in form of a vehicle bus initial vehicle service data in form of its vehicle identification 11a, charge level 11b of a battery of the vehicle 1, GPS location data 11c and the cable plugged event 11d along with a timestamp of plugging in the cable 10 (not shown) to the Raspberry Pi 2. The Raspberry Pi 2 then analyses these data 11a-11d using the analyzing unit 2a and triggers the charging process at the service provider 4 by sending a Start Charging message 12a over a first electronic control unit data connection 12. This request gets delivered via the first service data connection 13 by a Start Charging message 13a to the service point 3, which eventually provides electricity to the electric vehicle 1. When the charging started successfully, the Raspberry Pi 2 stores the vehicle service data, including the current timestamp and a sessionId, on a blockchain network 5, e.g., a Rinkeby Ethereum test network as shown in FIG. 1, via a second electronic control unit data connection 20.

When the cable 10 gets unplugged from the charging part of the vehicle 1, the Raspberry Pi 2 analyses the updated initial vehicle service data as final vehicle service data again by using the analyzing unit 2a. It triggers the Stop Charging event by sending the Stop Charging message 12b and the service point 3 stops to provide electricity upon receiving the Stop Charging message 13b from the service provider unit. The Raspberry Pi 2 then stores the final vehicle service data in form of its identity 20a, updated charge level 20b of the battery of the vehicle 1, updated GPS location data 20c and the duration 20d from the cable 10 plugged to unplugged and/or the cable unplugged event 11d along with an updated timestamp of unplugging the cable 10 via the second electronic control unit data connection 20 on the blockchain 5. The service provider 4 stores service provider service data in form of the charge 24a transferred to the vehicle 1 and a duration 24b from the cable 10 plugged to unplugged of the completed vehicle service gathered in the service provider 4 via a second service data connection 24 on the blockchain 5. A smart contract 6 compares the provided energy 24a of the service point 3 and the consumed energy as the difference between the initial charge level 11b and the updated charge level 20b of the vehicle 1 as charging energy data 25b which data is received by the smart contract 6 over a first blockchain data connection 25. Alternatively or additionally, the smart contract 6 may compare the duration from the cable 10 plugged to unplugged 20d of the electronic control unit 2 with the duration 24b from the cable 10 plugged to unplugged of the completed vehicle service gathered by the service provider 4 as charging duration data 25a. If the comparison is positive a payment 26a on a Tobalaba blockchain is triggered by the smart contract 6 over the first blockchain data connection 25 or a second 26 blockchain data connection and the process terminates. The Rinkeby Ethereum test network, the smart contract 6, and the Tobalaba blockchain are comprised by the blockchain 5.

With the workflow and functional units 1, 2, 3, 4, 5, and 6 of the system shown in FIG. 1, a native ecosystem is provided for enabling the car 1 to connect to and consume services and to pay for the consumptions. To demonstrate the applicability of the present subject matter, the electric vehicle charging use case has been shown in FIG. 1. A Raspberry Pi is used to represent the Vehicle Engine Control Unit 2 (ECU). The Raspberry Pi 2 connects to the diagnosis interface (OBD2) of the car 1, which allows to work with the real vehicle bus data and to collect the requirements when replacing the Raspberry Pi with the actual in-car ECU 2 since it has similar resource constraints.

As soon as the charging cable 10 is plugged in, the event is read from the vehicle bus 11. Then, the start charging event is triggered at the service point 3. To record the start of the charging process in a safe and trusted manner, a hash of the vehicle information, including the vehicle identification 11a, timestamp, and state of charge 11b of the battery is stored on the Ethereum blockchain, through a transaction which is signed by the electronic control unit 2. To increase the users' privacy, the user data is stored off-chain, i.e. not on the blockchain 5. Once the charging cable 10 is unplugged, the charging process is terminated through the stop charging event. Consequently, the hash of the updated vehicle data is stored on the Ethereum blockchain.

To ensure secure payment of the charging process that can be trusted by all involved parties, an Ethereum smart contract 6 is used. This contract 6 allows comparing the data of the service point 3 with the data of the vehicle 1. Depending on the business model of the charge point operator, either the charging duration 25a or the charging consumption 25b are compared. If the respective values lie within a certain threshold, the payment 26a is triggered automatically. Depending on the provider, the payment 26a can be made using blockchain technology (e.g., through a stable coin to prevent a price fluctuation of cryptocurrencies), or using conventional means like a credit card.

Among different smart contract designs, the most efficient system combines the systems' logic into one smart contract 6 which stores a hash of the vehicle data on the blockchain 5 and automatically compares the consumed energy. Also, using only one smart contract 6 for storing and comparing the data, instead of using several contracts, saves Ethereum Gas costs when deploying the smart contract 6. It also decreases the latency of the execution of the inventive method since it is possible to store the data and compare it using only one transaction. However, the one-contract approach violates the principle of the separation of concerns. Also, the inventive method cuts the number of involved parties to half since many intermediaries (i.e., Charge Point Aggregators or Payment Providers) are not required in the inventive system.

Figure 2:
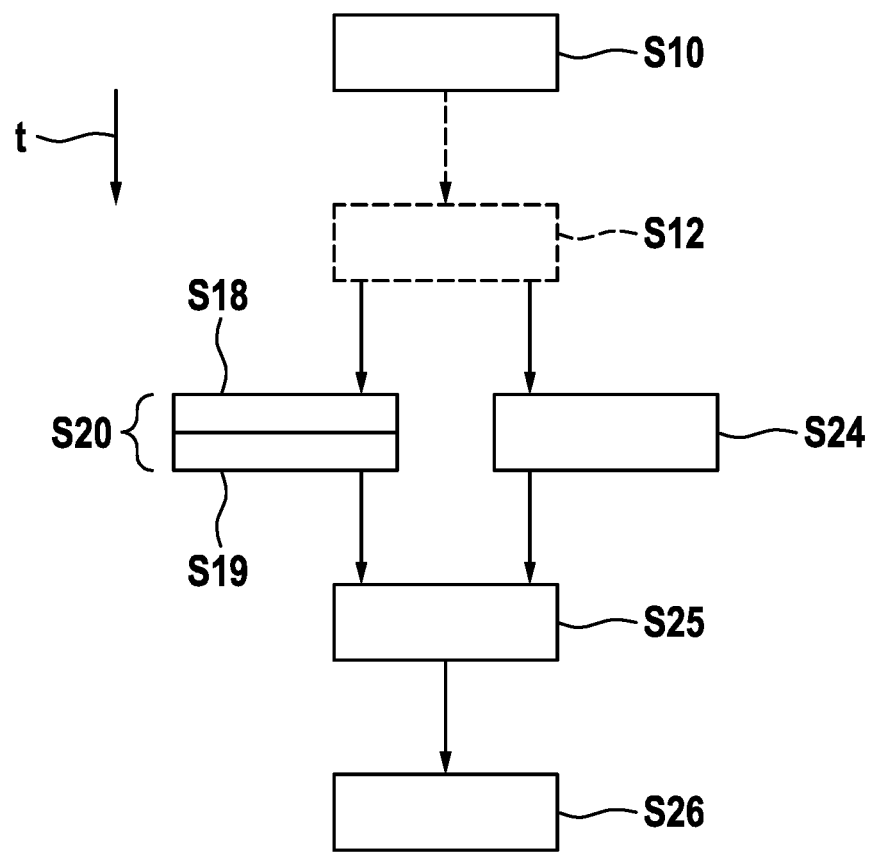
FIG. 2 is a schematic diagram of a sequence of method steps according to the present subject matter.

FIG. 2 shows a sequence of method steps of the inventive method in time from top to bottom. In the initial step S10, the data connection 10 is established a between the service point 3 for providing the vehicle service such as charging the electric vehicle 1 and the electronic control unit 2 of the vehicle 1, and gathering the initial vehicle service data at a start of the provision of the vehicle service in the electronic control unit 2. The initial vehicle service data comprise a timestamp of establishing the data connection 10, identification data 11a of the vehicle 1, and at the time of the timestamp the at least one value 11b of a state of the vehicle 1 indicating a quantity which is to be altered by the provision of the vehicle service, which may be the charging level or the charging duration. Step S12 comprises exchanging between the service provider 4 and the electronic control unit 2 a Start Charging message 12a to initiate a provision of the vehicle service, e.g., by sending the Start Charging message 12a from the electronic control unit 2 to the service provider 4, and, when the provision of the vehicle service is completed, a further message 12b indicating that the provision of the vehicle service is completed, e.g., by sending the further message 12b from the electronic control unit 2 to the service provider 4. The start and stop of the charging could be executed in another way, e.g., by the charging point 3 recognizing directly that the charging should stop, e.g., by monitoring a resistance of the battery of the electric car. Therefore, this step S12 is optional as indicated by dashed lines of the arrow and the rectangle representing this step.

The next step S20 focuses on storing the initial vehicle service data and final vehicle service data gathered in the electronic control unit 2, which are updated initial vehicle service data at an end of the completion of the provision of the vehicle service, consecutively as indicated by steps 18, 19 or along with each other as indicated as a single step S20 on the blockchain or blockchain network 5 configured to be resistant to modification of data. At the same time as steps 18, 19, 20 or before/after these steps, step S24 indicates storing on the blockchain network 5 service provider service data of the completed vehicle service gathered in the service provider 4, which is connected to the service point 3.

Subsequently, it is checked in step S25 on the blockchain network 5 the validity of the provision of the vehicle service by comparing at least the first numerical value 20b; 20d of the initial and final vehicle service data of a predetermined unit with at least the second numerical value 24a; 24b of the provider service data of the completed vehicle service of the predetermined unit, i.e. for example the charging duration 20d of the electronic control unit 2 and the charging duration 24b of the service provider 4 or the charging consumption 20b of the electronic control unit 2 and the charging consumption 24a of the service provider 4. The validity is positive, when the first 20b; 20d and second 24a; 24b numerical values and/or a third numerical value, which results from the comparison based on an arithmetical operation using the first 20b; 20d and second 24a; 24b numerical values, are/is within a predetermined range of numerical values or below/above a predetermined threshold value. The third numerical value may be calculated as a difference between the first and second numerical values, and/or as a ratio thereof. When the validity is positive, there is a triggering step S26 executed on the blockchain network 5 to trigger the process of payment 26a to pay for the vehicle service.

FIG. 3 shows a graphic representation of Ethereum transaction latencies using different network configurations of the system for checking the validity of the provision of the vehicle service and triggering the process to pay for the vehicle service. To evaluate the design, the latency that a user experiences when using the inventive automated system is compared with an existing manual and not-automated platform which authenticates users using an NFC card (NFC: Near field Communication) at the service point 3 and accepts payment 26a using predetermined payment information. It is also compared the cost of running the platform, especially regarding the transaction fees for Ethereum. The inventive method based on the Ethereum test-net blockchain is on average 30% faster than the existing manually-operated platform. The cost of using the inventive system can be reduced by almost 50% at an Ether price of 300$ compared to known solutions.

An added latency due to blockchain confirmation time is demonstrated in the graph in FIG. 3. It displays the average execution time 30 of all transactions for one charging process of 10 test cases each when charging an electric vehicle. Each charging process is represented by a column of stacked durations for performing the steps S18, S19, S25, and S26 along with an interaction S13a to start the charging (see messages 12a, 13a in FIG. 1) and an interaction S13b to stop the charging (see messages 12b, 13b in FIG. 1).

Different Gas prices [1 (see 31), 5 (see 32), 10 (see 33) and 100 GWei (see 34)] are compared on a remote node hosted by Infura 31, 32, 33, 34 with a remote node hosted on AWS (Amazon Web Services) 35 and one light node running on the Raspberry Pi 2 on the Rinkeby test network 36 to the non-blockchain solution 41 using API (Application Programming Interface) only. The same configuration has been tested on the Ropsten 37 and Tobalaba 40 test networks. Transaction costs for a Gas price of 1 GWei or 0.000000001 Ether is 65,697 Gas*0.000000001

Ether=0.000065697 Ether. An Ether price of 160.83$ results thus in a transaction fee of 0.01$.

The Rinkeby network has a block time of 15 seconds. When calling the Store Data function, it is sent to a pool of pending transactions. Since the test network does not have many pending transactions, it gets mined into the next block every time. This is the reason why increasing the transactions Gas price up to 100 GWei does not lead to better performance.

Ethereum offers different manners to execute a contract function: the standard transactions which have been used so far and contract calls. These calls are executed directly in the VM (Virtual Machine) of the node. This means that they never get sent to the network. Therefore, contract calls cannot change the state of the contract and thus, are read-only. In our case, a contract call for the comparison of the energy consumption or duration comparison methods can be used. These methods take the vehicle energy (charging duration) as a parameter and compare it to the energy (charging duration) of the service point 3. The call does not change the state of the blockchain and therefore does not consume any Gas. It calls the contract function and receives the outcome of the comparison as a return value. Since calling the contract function is done locally, no transaction mining is necessary. This increases the transaction speed by almost a magnitude of 100. The median execution time of the call function is 221 milliseconds on the contrary to 18.298 milliseconds when sending a transaction to the Infura node. This configuration using the remote node hosted by Infura running on the Rinkeby test network is referenced by sign 39. While the latency performance is excellent, the improvement in the execution time compared to the configuration 31 comes at the cost of reduced trust. Calling the method and executing it locally means that it is not written to the blockchain 5. This results in the fact that it is not possible to inspect the input values 25a, 25b for the comparison at a later stage. Eventually, this means that the comparison with the call method is as secure as implementing it directly in JavaScript, circumventing the blockchain 5 entirely. The improvement in convenience and usability thus comes at the cost of reduced trust.

The call of the storeData method takes up most of the latency time. The data storage S18, S19 and energy or time consumption comparison S25 transactions can be optimized. The storeData method is called within the compareEnergy method to get rid of one additional transaction. This configuration using the remote node hosted by Infura running on the Rinkeby test network is referenced by sign 38. The configuration 38 which combines the transactions for storing S18, S19 and comparing S25 the data (1 GWei 1 Contract Infura Rinkeby) is the one with the best performance on the Rinkeby and Ropsten networks since one additional storage transaction can be avoided.

The performance is better on the Tobabala network 40 which is an Ethereum based test network of the Energy Web Chain, which is only 10 seconds slower than using the non-blockchain solution 41. The manual process using the NFC card takes significantly longer than the 10 seconds added through the inventive method using blockchain technology.

According to the present subject matter, a method and system are presented that enable the vehicle to pay for services automatically. Each of the inventive method and the inventive system provides reliable storage for vehicle data, an automated plausibility check of the consumed energy, e.g., through smart contracts, and the option of payment using the blockchain technology. In a fully automated embodiment, autonomous cars are enabled to pay for vehicle services without user interactions.

A technical feature or several technical features which has/have been disclosed with respect to a singular or several embodiments disclosed herein before, e.g., using a smart contract 6 for the vehicle service of electrically charging the vehicle 1, may be present also in another embodiment, e.g., using the same smart contract for the vehicle service of paying a parking ticket or tolls, except it is/they are specified not to be present or it is impossible for it/them to be present for technical reasons.

The invention claimed is:

1. A method for updating a blockchain network, comprising:
   establishing a data connection between a service point for providing a vehicle service and an electronic control unit of a vehicle, wherein the vehicle service is directly related to the vehicle;
   gathering initial vehicle service data at a start of a provision of the vehicle service in the electronic control unit of the vehicle, wherein
      the initial vehicle service data comprises:
         a timestamp of establishing the data connection,
         identification data of the vehicle, and
         at least one value of a state of the vehicle indicating a quantity to be altered by the provision of the vehicle service;
   storing, automatically in response to detecting completion of provision of the vehicle service, the initial vehicle service data and final vehicle service data gathered in the electronic control unit from a perspective of the vehicle, wherein the final vehicle service data includes at least an updated value of the state of the vehicle that indicates the quantity that was altered by the provision of the vehicle service upon the completion of the provision of the vehicle service, wherein the initial vehicle service data and the final vehicle service data are stored automatically consecutively or along with each other on the blockchain network configured to be resistant to modification of data;
   storing, on the blockchain network automatically in response to detecting the completion of provision of the vehicle service, service provider service data of the completed vehicle service gathered in a service provider connected to the service point, the service provider service data including a quantity relating to the provision of the vehicle service from a perspective of the service provider;
   checking, on the blockchain network automatically in response to the initial vehicle service data and the final vehicle service data from the perspective of the vehicle and the service provider service data from the perspective of the service provider being stored on the blockchain network, a validity of the provision of the vehicle service by comparing at least a first numerical value of a predetermined unit and relating to the initial vehicle service data and the final vehicle service data stored on the blockchain network with at least a second numerical value of a predetermined unit and relating to the provider service data of the completed vehicle service stored on the blockchain network,
   wherein the validity is positive when the first and second numerical values and/or a third numerical value which results from the comparing based on an arithmetical operation using the first and second numerical values, are/is within a predetermined range of numerical values or below/above a predetermined threshold value; and automatically triggering on the blockchain network the process to pay for the vehicle service in response to the validity being positive.

2. The method of claim 1, comprising:
after establishing the data connection between the service point and the electronic control unit, and before storing the initial and final vehicle service data and the service provider service data on the blockchain network:
exchanging between the service provider and the electronic control unit a message to initiate the provision of the vehicle service by sending the message from the electronic control unit to the service provider; and
when the provision of the vehicle service is completed, sending a further message indicating that the provision of the vehicle service is completed from the electronic control unit to the service provider.

3. The method of claim 2, wherein
the establishing of the data connection is used as a trigger for the exchanging of the message between the service provider and the electronic control unit to initiate the provision of the vehicle service.

4. The method of claim 1, wherein
a hash of the initial vehicle service data and a further hash of the final vehicle service data are stored on the blockchain network, and
the hash and the further hash are signed by the electronic control unit.

5. The method of claim 1, wherein
the vehicle service comprises at least one of:
electric charging the vehicle being an electric vehicle or a hybrid vehicle,
fueling the vehicle comprising a combustion engine or a hydrogen engine,
fueling the vehicle being the hybrid vehicle,
parking,
paying tolls,
using the vehicle for rent, or
shopping from within the vehicle.

6. The method of claim 1, wherein
the vehicle service is electric charging of the vehicle,
the service point is an electric vehicle charging station,
the data connection between the electric vehicle charging station and the electronic control unit is established by plugging a charging cable of the electric vehicle charging station in a charging port of the vehicle, and
the first numerical value and the second numerical value each comprise a charging duration or a charging consumption.

7. The method of claim 1, wherein
the process to pay for the vehicle service is executed either on:
the blockchain network through a stable coin, or
using a credit card.

8. The method of claim 1, wherein
the storing of the initial and the final vehicle service data on the blockchain network, the checking of the validity of the provision of the vehicle service, and the triggering of the process to pay for the vehicle service occur automatically.

9. The method of claim 1, wherein
at least the checking of the validity of the provision of the vehicle service and the triggering of the process to pay for the vehicle service occur by using a smart contract, wherein
the smart contract is used as a single smart contract for different kinds of vehicle services.

10. The method of claim 1, wherein
the method occurs fully automated such that the method can be executed by the vehicle being an autonomous vehicle.

11. A non-transitory computer-readable medium comprising instructions operable, when executed by one or more computing systems, to perform the method of claim 1.

12. The method of claim 1, wherein
the provision of the vehicle service and the process to pay for the vehicle service occur without assistance from a human user.

13. A system for updating a blockchain network, comprising:
a data connection between a service point configured to provide a vehicle service and an electronic control unit of a vehicle, wherein the vehicle service is directly related to the vehicle, wherein
the electronic control unit is configured to gather initial vehicle service data at a start of a provision of the vehicle service in the electronic control unit of the vehicle from a perspective of the vehicle, and
the initial vehicle service data comprises:
a timestamp of establishing the data connection,
identification data of the vehicle, and
at least one value of a state of the vehicle indicating a quantity to be altered by the provision of the vehicle service as measured by the vehicle, and
the electronic control unit is configured to store the initial vehicle service data and final vehicle service data gathered in the electronic control unit, wherein the final vehicle service data includes at least an updated value of the state of the vehicle as measured by the vehicle and that indicates the quantity that was altered by the provision of the vehicle service from the perspective of the vehicle upon completion of the provision of the vehicle service, and automatically, in response to detecting the completion of provision of the vehicle service, store the initial vehicle service data and the final vehicle service data consecutively or along with each other on the blockchain network configured to be resistant to modification of data,
a service provider connected to the service point and configured to store, on the blockchain network automatically in response to detecting the completion of provision of the vehicle service, service provider service data of the completed provision of the vehicle service gathered in the service provider, the service provider service data including a quantity relating to the provision of the vehicle service from a perspective of the service provider; and
a smart contract in the blockchain network for checking, on the blockchain network automatically in response to the initial vehicle service data and the final vehicle service data from the perspective of the vehicle and the service provider service data from the perspective of the service provider being stored on the blockchain network, a validity of the provision of the vehicle service by comparing at least a first numerical value of a predetermined unit and relating to the initial vehicle service data and the final vehicle service data stored on the blockchain network with at least a second numerical value of a predetermined unit and relating to the provider service data of the completed vehicle service stored on the blockchain network,
wherein the validity is positive when the first and second numerical values and/or a third numerical value which results from the comparing based on an arithmetical operation using the first and second numerical values, are/is within a predetermined range of numerical values or below/above a predetermined threshold value, wherein the smart contract is further configured to automatically trigger the process to pay for the vehicle service on the blockchain network in response to the validity being positive.

14. The system of claim 13, wherein
the service point and service provider are integrated together.

15. The system of claim 13, wherein
the blockchain network is an Ethereum blockchain or an Ethereum main-net.

16. The system of claim 14, wherein
a Rinkeby network as an Ethereum test network,
a Ropsten network as a further Ethereum test network, or
a Tobalaba network as an Ethereum based test network of an Energy Web Chain,
   is configured to combine the storing of the initial and final vehicle service data on the blockchain network, the checking of the validity of the provision of the vehicle service, and the triggering of the process to pay for the vehicle service.

\* \* \* \* \*